United States Patent [19]

Rothschild et al.

[11] 4,399,732

[45] Aug. 23, 1983

[54] PITCH IDENTIFICATION DEVICE

[76] Inventors: Stanley Rothschild, 906 Kerwin Rd.; Samuel E. Ramsay, 202 Indian Spring Dr., both of Silver Spring, Md. 20901

[21] Appl. No.: 297,270

[22] Filed: Aug. 28, 1981

[51] Int. Cl.[3] ........................ G10G 7/00; G01H 13/00

[52] U.S. Cl. .................................... 84/454; 84/477 R; 84/DIG. 18; 73/648

[58] Field of Search ............. 84/454, 477 R, DIG. 18; 179/1 D, 1 M, 1 SP; 324/77 D, 77 E, 78 R, 78 F; 73/648

[56] References Cited

U.S. PATENT DOCUMENTS

| | | | |
|---|---|---|---|
| 2,207,450 | 7/1940 | Bergan et al. | 84/454 |
| 2,514,490 | 7/1950 | Hanert | 84/1.01 |
| 2,958,250 | 3/1955 | Poehler | 84/454 |
| 3,894,186 | 7/1975 | Humphrey et al. | 179/1 SA |
| 4,024,789 | 5/1977 | Humphrey et al. | 84/477 R |
| 4,041,783 | 8/1977 | Shimauchi et al. | 73/552 |
| 4,122,751 | 10/1978 | Calvin | 84/454 |
| 4,313,361 | 2/1982 | Deutsch | 84/DIG. 18 X |
| 4,354,418 | 10/1982 | Moravec | 84/454 |

*Primary Examiner*—William B. Perkey

*Attorney, Agent, or Firm*—Schwartz, Jeffery, Schwaab, Mack, Blumenthal & Koch

[57] ABSTRACT

A transducer receives notes from a musical instrument and converts them into electrical signals. The signals are passed to filter banks containing filters having pass-bands in different octave ranges. The filtered signals in each bank are added and translated in frequency to the frequency range of the highest octave of interest. The translated signals are then passed through a plurality of filters each of which is tuned to pass directly the frequency of one pitch in that octave. Indicators are attached to the pitch filters to indicate the presence of a signal passing therethrough. Also, additional indicators may be attached to the octave filters to indicate the octave from which the signal originated.

12 Claims, 4 Drawing Figures

PITCH IDENTIFICATION DEVICE

BACKGROUND OF THE INVENTION

This invention relates to devices for determining the pitch of notes generated by musical instruments.

The tuning procedure for any musical instrument generally requires great skill. Ordinarily, one note is tuned to a standard pitch. The other notes are then tuned relative to the first note and relative to each other by ear. This requires that the tuner be capable of discerning accurately specific frequencies, such as A which has a fundamental frequency of 440 vibrations per second. Accordingly, several devices have been proposed to assist musicians and other persons involved in tuning instruments in locating exact pitches.

One type of device determines the pitch of a musical tone by comparing it to a standard frequency internally generated by a frequency synthesizer. Such a system is shown in U.S. Pat. No. 2,958,250 to Poehler. The Poehler device, however, is deficient in that it requires a switch to be actuated in order to choose the pitch and octave of the pitch to be measured. Consequently, inasmuch as many musical instruments require the use of both hands for correct performance, a musician cannot check intervals by moving quickly from one note to another using the Poehler device.

U.S. Pat. No. 4,122,751 to Calvin discloses an automatic instrument tuner which compares an unknown frequency to an internally generated frequency. The internally generated frequency is produced by a synthesizer which steps through the entire spectrum until a match is found. However, the Calvin device is capable of only detecting and displaying one tone at a time.

U.S. Pat. No. 4,041,783 to Shimauchi et al discloses a system for measuring the vibration frequency of a vibrating object by deriving harmonic components of the vibrating object, measuring the frequencies of the derived harmonic components and obtaining the difference between the frequencies. The system described would not work if a pure tone were generated since it depends on measuring the frequency of adjacent harmonics of the fundamental.

U.S. Pat. No. 3,894,186 and U.S. Pat. No. 4,024,789 both issued to Humphrey et al disclose a tone analysis system in which a received musical tone is converted to an electrical wave. The electrical wave is passed through a plurality of filters which are tuned to pass the frequency of one of the notes of the musical scale. Lamps are individually energizable under control of the filters to represent the notes. The Humphrey et al device is deficient in that a separate filter must be provided for each and every note of the musical scale. Therefore, notes in several octaves cannot be identified without the use of an unduly large number of filters.

U.S. Pat. No. 2,207,450 to Bergan et al shows another musical tuning device in which an internally generated tone is compared to a received one to determine how far the received tone is from a true pitch. However, Bergan et al requires that the position of a switch be changed in order to reset the device for receiving different tones. Thus, the user is inhibited from measuring exact intervals without changing the switch setting.

Accordingly, a need has developed for a device which can determine the pitch of a received musical note, which device is easy to use and capable of receiving a succession of individual notes as well as being capable of receiving and identifying more than one note at a time.

SUMMARY OF THE INVENTION

The primary object of the present invention is to provide a pitch location device which can identify a tone having a frequency which falls within any of eight octaves.

A further object of the present invention is to provide a pitch location device which has the capability of indicating the pitch of at least two notes which may appear in adjacent octaves.

A further object of the present invention is to provide a pitch location device which can identify pitches in terms familiar to all musicians. That is, the device must identify the pitches in terms of standard musical notation such as A, F#, etc., rather than providing an indication of the frequency of the pitch.

Yet another object of the present invention is to provide a pitch location device which can be produced from a relatively limited number of components yet has great versatility.

In accordance with the above and other objects, the present invention is a device for determining the pitch of a sound produced by a musical instrument. The device comprises a transducer for converting the sound into an electrical signal. A frequency translation means receives the electrical signal from the transducer and translates the frequency of the signal to a predetermined octave band. A plurality of frequency pass devices are connected to the frequency translation means. Each of the frequency pass devices tuned to pass directly the frequency of one pitch in the predetermined octave band. A display means is connected to each of the frequency pass devices for indicating the presence of an electrical signal passed thereby.

In accordance with other aspects of the invention, the frequency translation means comprises a plurality of squaring circuits which are connected in series whereby the frequency of the electrical signal is doubled in each of the squaring circuits. Outputs are connected from each of the squaring circuits to a summing circuit and the output of the summing circuit is delivered to the frequency pass devices.

In accordance with other aspects of the present invention, at least two filters are connected to the transducer. Each of the filters has a passband for passing frequencies in a different octave. The frequency translation means includes a separate frequency translating apparatus associated with each of the filters for translating the frequency of the electrical signal to the predetermined octave band.

Also, the device may include separate banks of filters which are connected to the transducer. Each bank of filters comprises filters having passbands for passing frequencies in different octaves. Indicating devices may be connected to each of the filters to indicate the octave or octaves in which the electrical signal originated.

The present invention also comprises a method for determining the pitch of a sound produced by a musical instrument. The method comprises converting the sound into an electrical signal and translating the frequency of the signal to a predetermined octave band. The method further comprises passing the translated signal to a plurality of frequency pass devices which are each tuned to the frequency of one pitch in the predetermined octave band.

BRIEF DESCRIPTION OF THE DRAWINGS

The above and other objects of the present invention will become more apparent as the invention is more fully described in the detailed description, reference being had to the accompanying drawings in which like reference numerals represent like parts throughout, and in which.

DETAILED DESCRIPTION OF THE PREFERRED EMBODIMENTS

Figure 1:
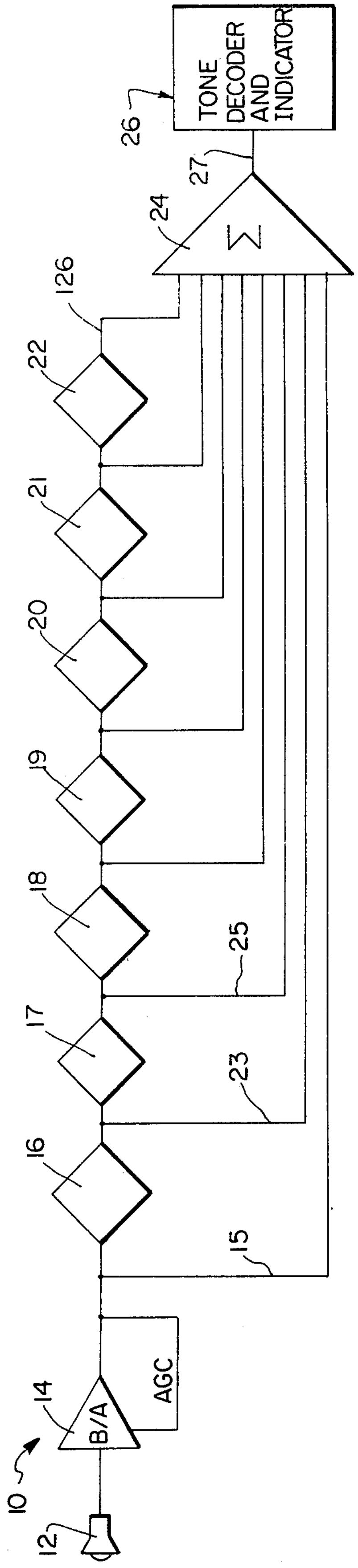
FIG. 1 is a schematic diagram showing a first embodiment of the pitch location device of the present invention.

FIG. 1 shows a pitch location device 10 which is adapted to receive and identify one pitch at a time which originates in any of eight octaves. Device 10 includes a microphone 12 which receives a sound generated by musical instruments such as a french horn, violin, or the like. The sound is transformed into an electrical signal in microphone 12 and passed to a buffer amplifier 14. Advantageously, buffer amplifier 14 should be included in an automatic gain control loop. Any known automatic gain control circuitry can be used for the purpose. The output of amplifier 12 is passed to a first squaring circuit 16. The output of squaring circuit 16 is passed to a second squaring circuit 17. The output of squaring circuit 17 is passed to a third squaring circuit 18. In like manner, the output of squaring circuits 18, 19, 20 and 21 are passed successively to each other and the output of squaring circuit 21 is finally passed to squaring circuit 22. Additionally, an output from amplifier 14 and each squaring circuit 16–22 is presented to summation circuit 24. Summation circuit 24 adds these outputs and presents a resultant output to tone decoder and indicator circuit 26. Circuit 26 rejects all signals the frequencies of which are not within the highest octave of interest to be detected by device 10. Circuit 26 also includes one indicator for each of twelve tones in the highest octave of interest as will be discussed hereinafter.

The purpose of squaring circuits 16 through 22 is to ensure that all sounds received by microphone 12 will be translated in frequency up to the highest octave of interest and therefore will be detected by circuit 26. Clearly, in operation, if the sound received by microphone 12 and passed through amplifier 14 is already in the highest octave of interest the sound will be passed from amplifier 14 through line 15 directly to summing circuit 24. The frequency of the sound will also be doubled in each squaring circuit and passed to summing circuit 24. However, these increased frequency signals will be rejected by circuit 26 and only the signal from line 15 will be detected by circuit 26.

A sound one octave below the highest octave of interest must be doubled in frequency in order to be detected by circuit 26. Accordingly, the output of squaring circuits 16 containing this sound would have such a doubled frequency component. This output is passed through line 23 and summing circuit 24 to circuit 26. Similarly, a tone three octaves below the highest octave of interest would be translated in frequency up to the highest octave of interest by the second squaring circuit 17. Consequently, output line 25 from circuit 17 would contain this frequency component which would then be passed through summing circuit 24 to circuit 26. In a similar manner, signals in each of a total of eight octaves can be detected by device 10 with the lowest octave being seven octaves below the highest octave of interest. A tone in the lowest octave would be doubled in frequency seven times by being passed through each of squaring circuits 16 through 22 and outputed on line 126 from circuit 22 to summing circuit 24.

Figure 3:
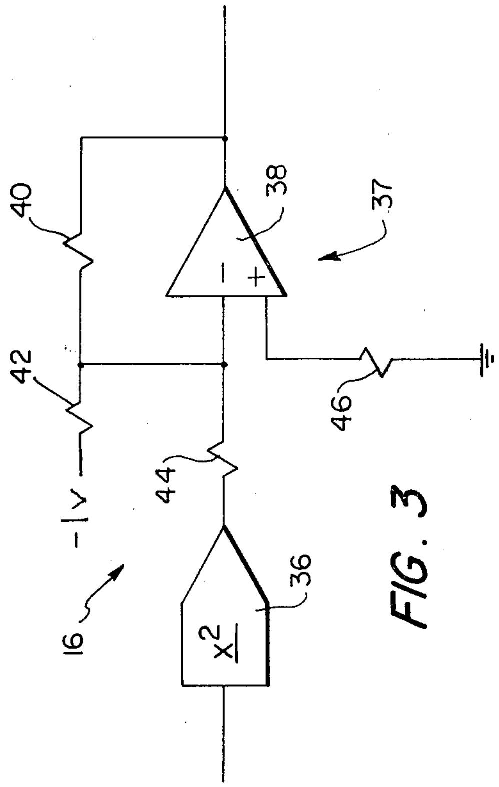
FIG. 3 is a schematic diagram showing a squaring circuit to be used with the pitch location device of the present invention.

Each of squaring circuits 16 through 22 is identical in configuration. Accordingly, the details of only one squaring circuit, circuit 16, are shown in FIG. 3, it being understood that all other squaring circuits are the same. As shown in FIG. 3, squaring circuit 16 comprises a square law device 36 connected to an amplifier 37. Square law device 36 may be any standard available square law device, such as an appropriately biased transistor, diode or the like. Alternatively, an integrated circuit multiplier may be used, such as, for example, a device manufactured by Analog Devices, their model number 532 multiplier. For an input sound of a signal tone, the output of square law device 36 is given by the mathematical equation:

$$E_o=(-\cos \omega_1 t)^2=\tfrac{1}{2}=\tfrac{1}{2}\cos 2\omega_1 t$$

where $\cos \omega_1 t$ represents the input tone having a frequency $\omega_1/2\pi$, and $E_o$ represents the output of device 36.

Clearly, the output of square law device 36 includes a tone at twice the frequency of the input tone. However, the output also includes a constant term which must be removed by amplifier 37. Amplifier 37 comprises an input resistor 44 which connects the output of square law device 36 to the inverting input of operational amplifier 38. Resistor 44 has the value of R, where R represents some convenient value, for example 1000 ohms. A minus one volt supply is taken through a second input resistor 42 to the inverting input of operational amplifier 38. Resistor 42 has the value of 2R. The output of operational amplifier 38 is sent back through resistor 40 to the inverting input. Resistor 40 has a value of 2R. The non-inverting input of operational amplifier 38 is references to ground through resistor 46. Assuming an input to amplifier 37 from the output of square law device 36, as given above, the output of amplifier 37 is as follows:

$$E=-\left[-1\times\frac{2R}{2R}+\left(\tfrac{1}{2}+\tfrac{1}{2}\cos 2\omega_1 t\right)\frac{2R}{R}\right]$$
$$=-\cos 2\omega_1 t;$$ where $E$ is the output of amplifier 37.

Figure 2:
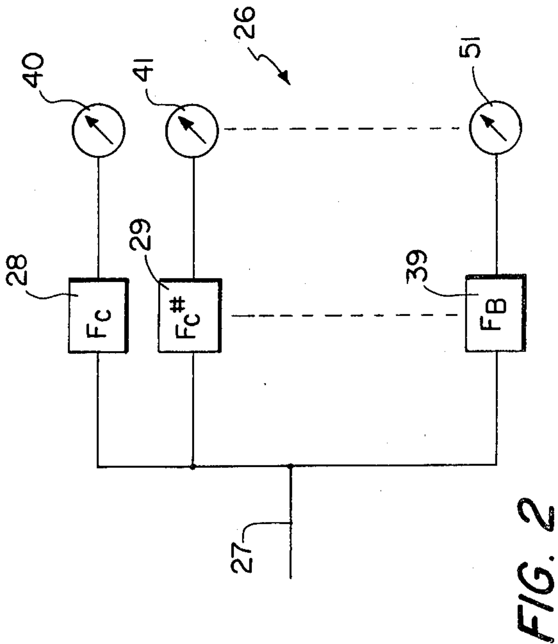
FIG. 2 is a schematic diagram showing a tone decoder to be used with the pitch location device of the present invention.

FIG. 2 sets forth in further detail a tone decoder and indicator circuit 26. Circuit 26 receives an input on line 27 from summing circuit 24 shown in FIG. 1. The input signal received on line 27 contains one output from each squaring circuit 16 through 22 and an output from buffer amplifier 14 as discussed above. Each of the outputs contains a frequency which is twice the frequency of the preceding output. Consequently, assuming that the tone received by microphone 12 is note C, line 27 is connected to a plurality of filters. In the embodiment shown, twelve filters are to be used representing the notes C, C#, D, D#, E, F, F#, G, G#, A, A# and B. Of all twelve filters which are to be used, only three filters are shown, filters 28, 29 and 39. The filters are tuned such that each filter passes directly only a frequency associated with one of the notes mentioned above in the highest octave of interest. Consequently, in the example mentioned above, the originally received note C would be translated in frequency to the highest octave of interest regardless of the octave in which it originated. Once so translated, the note would be passed through, for example, filter 28 which would be tuned to the frequency of C in the highest octave of interest.

A separate meter is to be connected to each filter 28, 29 and 39. Three meters are shown at 40, 41 and 51 connected, respectively to filters 28, 29 and 39. Meters 40 through 51 act as visual indicators representing that a signal has passed through the corresponding filter.

To improve versatility of the device 10, a Signetics SE/ME 567 tone and frequency decoder may be used in place of each filter 28, 29 and 39. Such a decoder produces as one of its outputs a voltage which is a linear function of frequency over the range of 0.95 to 1.05 times the desired center frequency with a slope of approximately 20 millivolts per percent of frequency deviation. In this case, the associated meters 40 through 51 would give an indication of the pitch of the received tone and the deviation, either sharp or flat from the desired exact pitch.

Pitch location device 10 can receive one note at a time, translate that note up to the highest octave of interest and identify the pitch of the note without the necessity of being retuned for each new note being played. However, in the event that two notes are played at one time, the two notes would be cross modulated in each of the squaring circuits 16 through 22 giving the possibility that an inaccurate readout from circuit 26 will be had in the event that one of the cross modulation products produces frequencies in the highest octave of interest.

Figure 4:
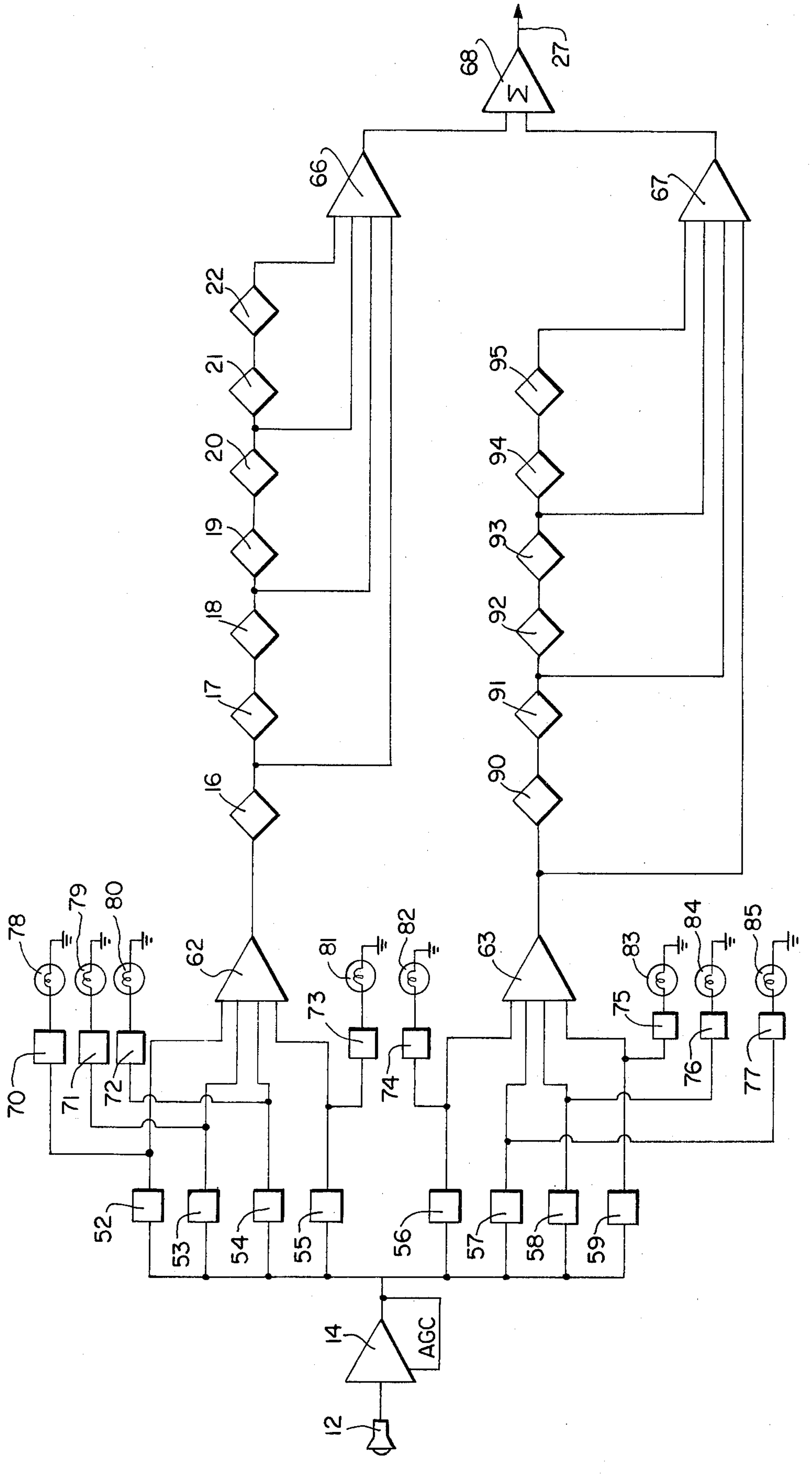
FIG. 4 is a schematic diagram showing a second embodiment of a pitch location device according to the present invention.

A second embodiment of the present invention, shown in FIG. 4 and indicated generally by the reference numeral 50, is adapted to receive two notes at a time. Additionally, device 50 has the capability of indicating the octave in which the generated note originated.

Device 50 includes a microphone 12 which feeds an automatic gain control amplifier 14. The output of amplifier 14 is fed to two banks of bandpass filters. The first bank of filters includes filters 52, 53, 54 and 55 which pass the first, third, fifth, and seventh octaves of interest, respectively. The second bank of filters comprises filters 56, 57, 58 and 59 which pass the second, fourth, sixth and eighth octaves of interest. Each of the filters 52 through 59 has a bandwidth equal to one octave. The filters may be any typically available filters such as those sold by TTE, Inc. of Los Angeles, California. The outputs from filters 52 through 55 are summed in summing amplifier 62 and then passed to a first chain of multipliers comprising seven squaring circuits 16 through 22. The outputs from the second bank of filters are passed to summing amplifier 63 and then to a second chain of multipliers comprising six squaring circuits 90 through 95. In the first chain, squaring circuits 16, 18, 20 and 22 have outputs which are connected to summing amplifier 66. In the second chain, summing amplifier 67 receives outputs from amplifier 63 and squaring circuits 91, 93 and 95. The outputs of summing amplifiers 66 and 67 are received by summing amplifier 68, the output from which is delivered through line 27 to a tone decoder and indicator circuit 26 as shown in FIG. 2. Outputs are also taken from bandpass filters 52 through 59 and delivered to lamp driver circuits 70 through 77, respectively. Lamp driver circuits 70 through 77 may be in the form of transistors, relays or the like and are operative to energize lamps 78 through 85, respectively.

In operation, it can be seen that device 50 can accept two tones in adjacent octaves. One tone is passed through the bank of filters comprising filters 52 through 55 and the other note is passed through the second bank of filters comprising filters 56 through 59. Assuming, for example, that the first note is in the lowest octave of interest, the note would be passed through filter 52 to summing amplifier 62. The note also would be passed to circuit 70 and lamp 78 would be illuminated to indicate the octave of origination of the note. The note would then be passed through summing amplifier 62 and each of the squaring circuits 16 through 22. Summing amplifier 16 would add outputs from summing amplifiers 16, 18, 20 and 22 containing the frequency of the note multiplied by two, eight, thirty-two and one hundred twenty-eight. These frequencies are passed through line 27 to tone decoder and indicator circuit 26 shown in FIG. 2 where only the top octave frequency is detected.

Similarly, the second tone generated activates the appropriate one of lamps 82 through 85 to indicate its octave or origin. The second tone is passed through summing amplifier 63 and each of squaring circuits 90 through 95. The various frequency translations of the tone are added in summing amplifier 67 and passed through summing circuit 68 together with the output of summing amplifier 66 to tone decoder and indicator circuit 26 of FIG. 2 where only the top octave frequency is detected.

Naturally, if desired, the number of tones which can simultaneously be detected can be increased by simply increasing the number of chains of squaring circuits. Optimally, a separate chain of squaring circuits could be provided for each bandpass filter 52 through 59. Clearly, bandpass filter 52, being the lowest octave of interest, would require a chain of seven squaring circuits. Filter 56 being the second lowest octave of interest would require six squaring circuits, filter 53 would require five squaring circuits, filter 57 would require four squaring circuits, filter 54 would require three squaring circuits, filter 58 would require two squaring circuits, filter 55 would require one squaring circuit, and filter 59 would require no squaring circuit.

The above description is considered to be only illustrative and not limitative of the invention. Obviously, numerous modifications, changes and additions may be made to the present invention without departing from the scope thereof as set forth in the appended claims.

We claim:

1. A device for determining the pitch of a sound, comprising:
   - a transducer for converting said sound into an electrical signal;
   - frequency translation means for translating the frequency of said electrical signal to a predetermined octave range;
   - a plurality of frequency sensitive means connected to said frequency translation means, each of said frequency sensitive means being tuned to detect directly the frequency of one pitch in said predetermined octave band; and display means connected to each of said frequency sensitive means for indicating the pitch of a signal detected thereby.

2. The device as set forth in claim 1 wherein said frequency translation means comprises a plurality of squaring circuits connected in series whereby the frequency of said electrical signal is doubled in each of said squaring circuits.

3. The device as set forth in claim 2 and further wherein said frequency translation means comprises a summing circuit having inputs taken from said squaring circuits.

4. The device as set forth in claim 1 and further including at least two filters connected to said transducer, each of said filters having a passband for passing frequencies in a different octave, and further wherein said frequency translation means includes a separate frequency translating apparatus associated with each of said filters for translating the frequency of said electrical signal to said predetermined octave band.

5. The device as set forth in claim 1 and further including at least two banks of filters connected to said transducer, each of said banks comprising filters having passbands for passing frequencies in different octaves, and wherein said frequency translation means includes a separate frequency translating apparatus associated with each of said banks of filters for translating the frequency of said electrical signal to said predetermined octave band.

6. The device as set forth in claim 5 wherein said passbands of each of said filters in each of said banks are non-adjacent to the passbands of any other filters in the same bank.

7. The device as set forth in claim 4 or 5 and including octave indicator means connected to each of said filters for indicating the passage of a signal therethrough.

8. The device as set forth in claim 1 wherein said frequency sensitive means comprise filters.

9. The device as set forth in claim 1 wherein each of said frequency sensitive means comprises a frequency decoding device which includes means for outputting a signal related to the difference in frequency between a detected signal and the pitch said decoding device is tuned to detect directly.

10. A method for determining the pitch of a sound produced by a musical instrument, comprising:

sensing said sound and converting said sound into an electrical signal;

translating the frequency of said electrical signal to a predetermined octave band;

passing said translated signal to a plurality of frequency sensitive devices, each of said frequency sensitive devices being tuned to detect directly the frequency of one pitch in said predetermined octave band; and providing a display indicative of the pitch of a signal being detected by said frequency sensitive devices.

11. The method as set forth in claim 9 and further including the step of filtering said electrical signal into a plurality of different octave bands prior to translating the frequency of said electrical signal.

12. The method as set forth in claim 9 wherein the step of translating the frequency of said electrical signal includes producing the square of said electrical signal.

* * * * *